(12) United States Patent
Stewart et al.

(10) Patent No.: US 8,430,339 B2
(45) Date of Patent: Apr. 30, 2013

(54) ADJUSTABLE SPRINKLER HEAD RISER

(75) Inventors: Donald George Stewart, Surrey (CA); Geordie Wayne Vandekerckhove, Surrey (CA)

(73) Assignee: Donald George Stewart, Surrey (CA)

( * ) Notice: Subject to any disclaimer, the term of this patent is extended or adjusted under 35 U.S.C. 154(b) by 159 days.

(21) Appl. No.: 12/093,509

(22) PCT Filed: Apr. 4, 2007

(86) PCT No.: PCT/CA2007/000564
§ 371 (c)(1),
(2), (4) Date: May 13, 2008

(87) PCT Pub. No.: WO2007/112588
PCT Pub. Date: Oct. 11, 2007

(65) Prior Publication Data
US 2008/0230627 A1    Sep. 25, 2008

(30) Foreign Application Priority Data

Apr. 5, 2006    (WO) ............... PCT/CA2006/000535

(51) Int. Cl.
*B05B 15/10*    (2006.01)
*B05B 1/32*    (2006.01)
*F01B 31/00*    (2006.01)
*F16L 15/02*    (2006.01)
*F16L 49/00*    (2006.01)

(52) U.S. Cl.
USPC ........... 239/203; 239/200; 239/201; 239/541; 92/108; 92/110; 285/302

(58) Field of Classification Search ................. 239/200, 239/201, 203, 204, 205, 206, 541; 285/298, 285/299, 300, 302; 92/107, 108, 109, 110, 92/164
See application file for complete search history.

(56) References Cited

U.S. PATENT DOCUMENTS 1,123,746 A   1/1915   Howard
1,337,744 A   4/1920   Ballerstedt
(Continued)

FOREIGN PATENT DOCUMENTS

DE   2 455 645 A1   6/1975
DE   36 10 836 C2   10/1987
(Continued)

OTHER PUBLICATIONS

International Search Report and Written Opinion mailed Oct. 4, 2006, issued in corresponding International Application No. PCT/CA2006/000535, filed Apr. 5, 2006.

(Continued)

*Primary Examiner* — Ryan Reis
(74) *Attorney, Agent, or Firm* — Christensen O'Connor Johnson Kindness PLLC

(57) ABSTRACT

An apparatus for lengthening an extendible pipe comprised of first and second pipe portions having an interior includes a cylinder having an end wall and an open end connected to the first pipe portion. A piston is received in slidable and sealable engagement with the cylinder and is connected to the second pipe portion. The piston, cylinder and end wall define a chamber that is physically isolated from the interior of the pipe. Introduction of a control fluid into the chamber displaces the piston relative to the cylinder so as to lengthen the pipe. The apparatus above may be applied to a sprinkler head riser apparatus and buried as part of an in-ground sprinkler system.

27 Claims, 9 Drawing Sheets

U.S. PATENT DOCUMENTS

| | | | |
|---|---|---|---|
| 1,833,040 A | 11/1931 | Rader | |
| 2,623,421 A | 12/1952 | Wilson, Jr. | |
| 2,968,440 A | 1/1961 | Cone | |
| 3,083,914 A | 4/1963 | Smith | |
| 3,317,144 A | 5/1967 | Muschett | |
| 3,331,292 A * | 7/1967 | Seablom | 92/108 |
| 3,343,796 A | 9/1967 | Trickey | |
| 3,369,828 A | 2/1968 | Trickey | |
| 3,427,051 A | 2/1969 | White | |
| 3,466,738 A | 9/1969 | Mount | |
| 3,485,046 A | 12/1969 | Gebhardt | |
| 3,637,139 A | 1/1972 | Felix | |
| 3,674,210 A | 7/1972 | Faragasso | |
| 3,684,179 A | 8/1972 | Fischer | |
| 3,776,463 A | 12/1973 | Dyck | |
| 3,847,392 A | 11/1974 | Horwinski | |
| 3,921,911 A | 11/1975 | Sheets | |
| 3,996,839 A * | 12/1976 | Norwood | 91/388 |
| 4,099,670 A | 7/1978 | Cole | |
| 4,242,947 A * | 1/1981 | Renner et al. | 92/108 |
| 4,274,592 A | 6/1981 | Westhusin | |
| 4,367,981 A | 1/1983 | Shapiro | |
| 4,482,171 A | 11/1984 | Campbell | |
| 4,608,912 A | 9/1986 | Navarette | |
| 4,615,542 A * | 10/1986 | Ideno et al. | 285/11 |
| 4,749,127 A * | 6/1988 | Ash | 239/14.2 |
| 4,769,892 A | 9/1988 | Kneller | |
| 5,040,729 A | 8/1991 | Carrozza | |
| 5,079,816 A | 1/1992 | Fisk | |
| 5,133,501 A | 7/1992 | Marshall | |
| 5,141,255 A | 8/1992 | Hanaoka | |
| 5,163,618 A | 11/1992 | Cordua | |
| 5,242,112 A | 9/1993 | Dunn | |
| 5,458,290 A | 10/1995 | Johnson | |
| 6,050,500 A | 4/2000 | Ensworth | |
| 6,193,168 B1 | 2/2001 | Bedford | |
| 6,629,648 B1 | 10/2003 | Jones | |
| 6,874,696 B1 | 4/2005 | Erickson | |
| 6,959,880 B2 * | 11/2005 | Swingley | 239/200 |
| 2006/0054016 A1 * | 3/2006 | Davies et al. | 92/109 |

FOREIGN PATENT DOCUMENTS

| | | |
|---|---|---|
| EP | 0 150 686 A2 | 8/1985 |
| FR | 2 270 951 A1 | 12/1975 |
| FR | 2 704 497 A1 | 11/1994 |
| GB | 2118263 A | 10/1983 |
| JP | 52-105115 U | 8/1977 |
| JP | 60-183393 A | 9/1985 |
| JP | 3-115062 U | 11/1991 |

OTHER PUBLICATIONS

International Preliminary Report on Patentability and Written Opinion dated Oct. 8, 2008, issued in corresponding International Application No. PCT/CA2007/000564, filed Apr. 4, 2007.

Canadian Office Action, mailed Nov. 5, 2009, issued in corresponding Canadian Application No. 2,623,421, filed Mar. 20, 2008, 3 pages.

Canadian Office Action, mailed Nov. 10, 2010, issued in corresponding Canadian Application No. 2,623,421, filed Mar. 20, 2008, 2 pages.

Examination Report Under Section 18(3) mailed Aug. 23, 2010, issued in corresponding United Kingdom Application No. GB 0816313.1, filed Apr. 4, 2007, 2 pages.

Examination Report Under Section 18(3), mailed Jan. 20, 2011, issued in corresponding Great Britain Application No. GB 0816313.1, filed Apr. 4, 2007, 3 pages.

Chinese Office Action mailed Apr. 14, 2011, issued in corresponding Chinese Application No. 200780011998.3, filed Apr. 5, 2006, 11 pages.

* cited by examiner

ADJUSTABLE SPRINKLER HEAD RISER

BACKGROUND OF THE INVENTION

1. Field of Invention

This invention relates generally to adjusting the length of a pipe, and more particularly, to an apparatus and method for adjusting the height of a sprinkler head riser.

2. Description of Related Art

In golf courses, lawns and other grass covered areas, frequent watering is required to maintain the area in an esthetically pleasing and healthy condition. It is well known in the art that a network of distributed pipes and sprinkler head attachments may be provided underneath the surface of the ground to provide the required watering. Such an underground system is not visible when not in use, and does not require set up for each watering, but merely requires activation.

In the field of golf course design, in-ground sprinkler heads and their associated network of piping are common. The use of in-ground sprinkler systems in golf courses, however, presents unique design requirements due to the nature of the game of golf which is played around such sprinkler heads.

Firstly, the top surface of the sprinkler head is required to be as level with the surround ground as possible. Should the sprinkler head extend above the surface of the surrounding ground, it may pose a hindrance or obstruction to any golf ball which may come into contact or close proximity to the sprinkler head. Conversely, should the sprinkler head be at a position below the surface of the surrounding ground, the sprinkler head may create a depression in the playing surface of the golf course with the result that golf balls tend to roll into such a depression. Therefore, should the top surface of the sprinkler head assembly not be flush with the surrounding ground, the sprinkler may serve to reduce the enjoyment of the golf players, due to the above-mentioned hindrances, thereby reducing the desirability of the course.

Secondly, a frequent activity of golf course maintenance is to distribute sand or other soil material across the top surface of the golf course. This addition of soil to the golf course may serve to reduce the height of the top surface of the sprinkler head relative to the surrounding ground as the additional soil is added. Therefore, it is frequently necessary to increase the height of the sprinkler head relative to the distribution piping network so as to maintain the top surface of the sprinkler head flush with the surrounding ground. In the past, this activity has required excavation of the sprinklers so as to adjust the height of the sprinkler head relative to the water supply lines. This is commonly accomplished by adjusting the angle of a conventional swing joint. It will be appreciated that such an activity of excavating and adjusting the height of each individual sprinkler head on a golf course is a time consuming and expensive activity. This periodic excavation of the sprinkler heads, also serves to render the immediate vicinity around the sprinkler head unplayable for a certain period of time while the necessary adjustments are being made.

In addition, any grassy surface such as a golf course is required to be cut periodically through the use of a mower. On a property such as a golf course, such a mower is a large piece of equipment having a substantial weight. During the process of mowing the golf course, the wheels of such a mower may ride over top of a sprinkler in the ground. This will transfer the large weight of mower to the sprinkler head and any equipment under it for a short period of time.

Therefore, any structure applied under a sprinkler head assembly will be required to be strong and flexible enough so as to receive the weight of the machinery on the top surface without breaking the underlying piping structure or causing a leak which would be required to be excavated and repaired. The apparatus should also allow for the sprinkler head to accept the weight of the mower on the top surface and still return the sprinkler head to a position flush with the surrounding ground.

Several attempts have been made to supply a sprinkler head riser having adjustable length so as to allow the height of the sprinkler head to be readily adjusted. All previous attempts to solve this problem have resulted in defects that have limited their acceptance. Many of these attempts still require the sprinkler head riser assembly to be excavated to access the adjusting means which is buried.

In addition, many previous attempts have relied upon threading or ridges between a pair of telescoping bodies. These attempts have relied on a fixed structure to extend the riser assembly and resist the compressive forces of the mower. Disadvantageously, such mechanisms may become damaged and jammed should the applied weight of the mower become to great. In addition, such mechanisms have a tendency to become jammed by the inclusion of dirt and other contaminants.

Other previous attempts have relied upon a biasing element securing a connection between two telescoping members. These mechanisms rely on a frictional or non-returning engagement between the biasing element and the telescoping members to secure relative position between them. These mechanisms have the disadvantage of not enabling the height of the sprinkler head to return to a set position after been forcibly compressed, for example, by the weight of a mower.

Finally, attempts have been made to enable a portion of one telescoping member to ride on a spiral spring contained within another telescoping member. These mechanisms have typically included the spring and telescoping apparatus in the stream of water passing through the sprinkler head riser and therefore, are prone to fouling and corrosion from the water and its included minerals.

What is required is a sprinkler head riser apparatus, the height of which may be adjusted without excavation of the apparatus that is able to withstand the weight of a mower placed on the sprinkler head without damage to the apparatus and surrounding piping. It is also desirable that the riser apparatus protects the height adjusting means from fouling from soil or contaminants in the water.

SUMMARY OF THE INVENTION

Accordingly, the present invention provides an apparatus for lengthening an extendible pipe comprised of first and second pipe portions having an interior, the apparatus comprising: a cylinder having an end wall and an open end, the cylinder being connected to the first pipe portion; and a piston received in slidable and sealable engagement with said cylinder, the piston being connected to the second pipe portion, wherein said piston, cylinder and end wall define a chamber; wherein said chamber is operable to receive a control fluid thereby displacing said piston relative to said cylinder so as to lengthen the pipe, wherein the chamber is physically isolated from the interior of the pipe.

According to a first embodiment of the present invention, there is provided an apparatus for changing the length of a pipe comprised of first and second axially aligned pipe portions each having an interior. The apparatus includes a cylinder having an end wall and an open end wherein the cylinder is connectable to the first pipe portion and a piston received in slidable and sealable engagement with said cylinder. The piston is connectable to the second pipe portion, wherein the piston, cylinder and end wall define a chamber. The chamber is adapted to receive a control fluid for displacing the piston relative to the cylinder to vary the distance between the first and second pipe portions while permitting fluid communication between the pipe portions. The chamber is also physically isolated from the interiors of the first and second pipe portions.

According to a further embodiment of the present invention, there is provided a sprinkler head riser apparatus comprising a first cylindrical pipe portion and a second cylindrical pipe portion axially aligned with the first pipe portion so as to form a common pipe having an interior. The apparatus further includes a cylinder having an end wall and an open end connected to the first pipe portion and a piston received in slidable and sealable engagement with the cylinder. The piston is connected to the second pipe portion, wherein the piston, cylinder and end wall define a chamber. The chamber is adapted to receive a control fluid thereby displacing the piston relative to the cylinder to vary the distance between the first and second pipe portions while permitting fluid communication between the pipe portions. The chamber is also physically isolated from the interior of the pipe.

According to a further embodiment of the present invention, there is provided a method of changing the length of a pipe operable to convey a fluid. The method comprises providing a pipe comprising first and second pipe portions wherein the first and second pipe portions are axially aligned and define a common sealed passage therethrough. The method further includes introducing a control fluid into a chamber connected to the first pipe portion so as to displace a piston slidably and sealably contained within the chamber wherein the piston is connected to the second pipe portion. The displacement of the piston varies the distance between the first and second pipe portions, and the chamber is physically isolated from the common sealed passage through the first and second pipe portions.

BRIEF DESCRIPTION OF THE DRAWINGS

In drawings which illustrate embodiments of the invention.

DETAILED DESCRIPTION

First Embodiment

Figure 1:
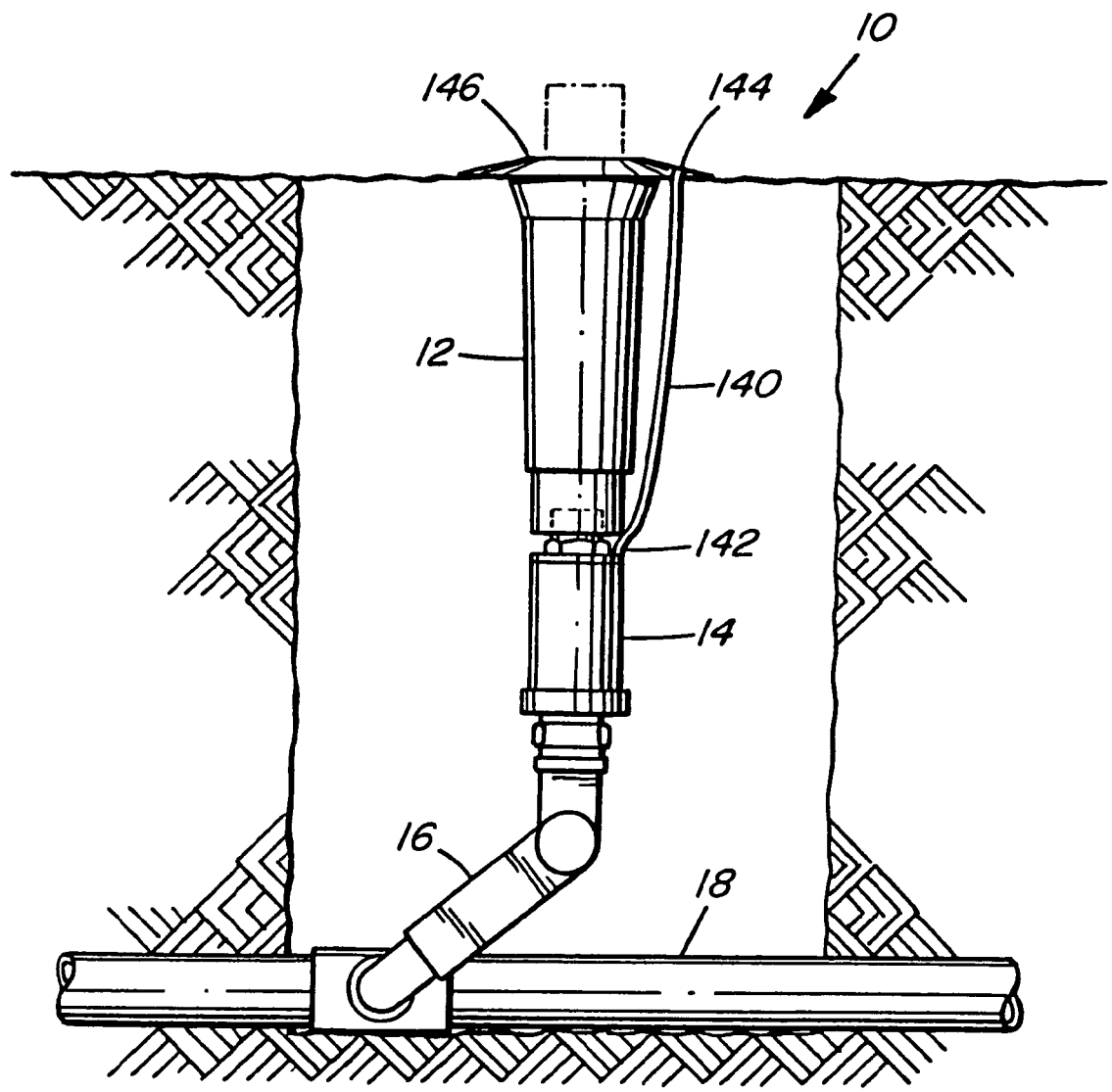
FIG. 1 is a side view of an in-ground sprinkler head installation according to a first embodiment of the invention.

Referring to FIG. 1, an in-ground sprinkler system including an adjustable sprinkler head riser assembly 14 according to a first embodiment of the present invention is shown generally at 10. The in-ground sprinkler system comprises a sprinkler head assembly 12, an sprinkler head riser assembly 14, a swing joint 16 and a water supply pipe 18. The sprinkler head assembly 12, swing joint 16 and water supply pipe 18 are conventional in the art.

The swing joint 16 comprises a tubular body having first and second pivotable joints that enables the height of the sprinkler head to be adjusted during installation by pivoting the swing arm assembly about the pivot connected to the water supply main. The adjustable sprinkler head riser assembly 14 may be threadably attached to the swing joint 16. The sprinkler head assembly 12 may be threadably attached to the sprinkler head riser assembly. Accordingly, the swing joint 16 and sprinkler head riser assembly 14 form a continuous water conduit path between the water supply pipe 18 and the sprinkler head assembly 12.

In a conventional in-ground sprinkler system, the height of the sprinkler head may be adjusted at the time of installation by means of the swing joint 16. According to the present invention, the height of the sprinkler head may additionally be adjusted after installation by means of the adjustable sprinkler head riser assembly 14. It will be appreciated that although the current embodiment of the present invention includes a swing joint 16, such an assembly may not be necessary and the sprinkler head riser assembly 14 may be connected directly to the water supply pipe 18.

Figure 2:
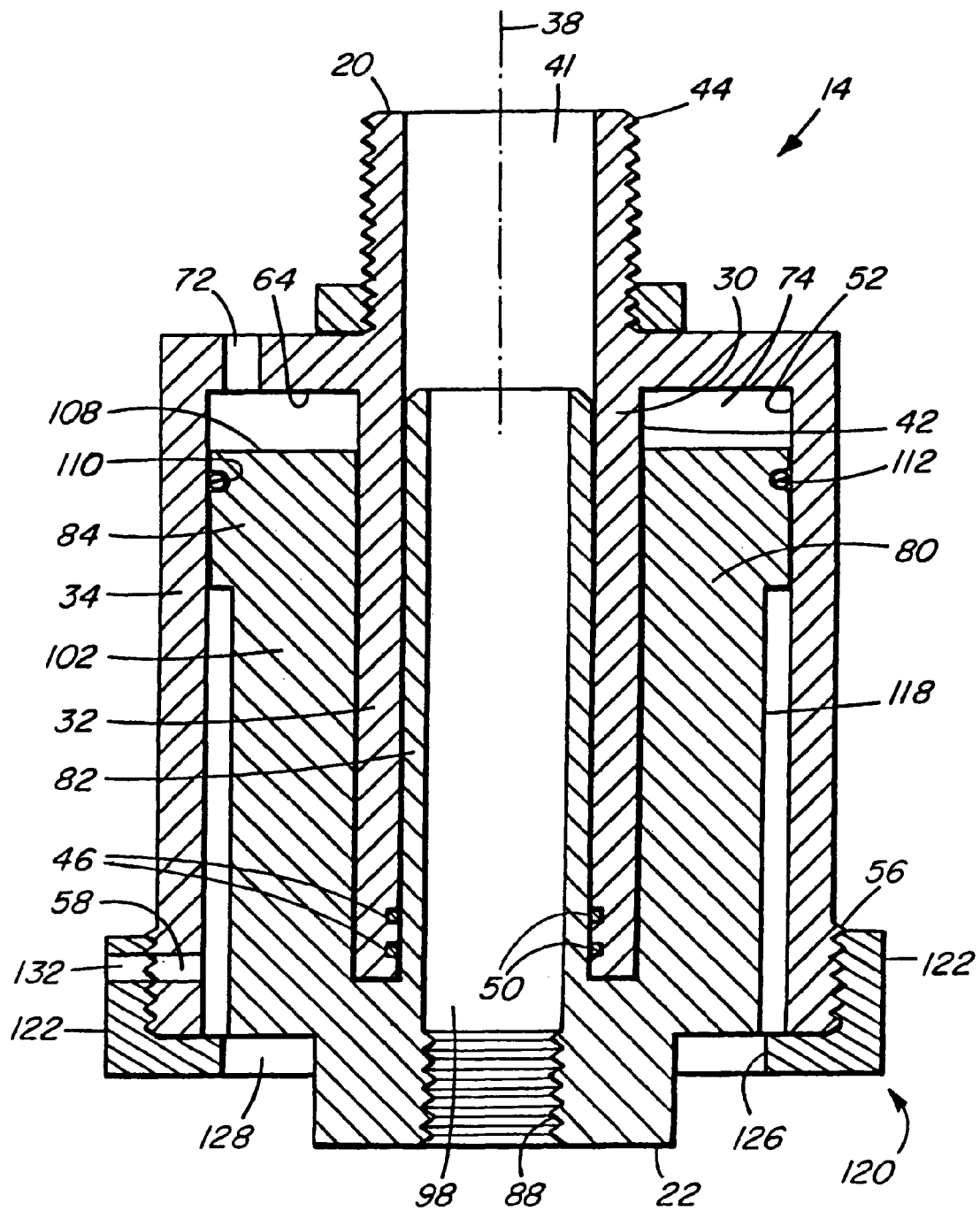
FIG. 2 is a cross-sectional view of a sprinkler head riser apparatus according to a first embodiment of the invention.

Referring to FIG. 2, a cross-sectional view of an assembled adjustable sprinkler head riser assembly 14 in accordance with the first embodiment of the invention is shown. The sprinkler head riser assembly 14 comprises a substantially elongate extendible tubular body having first and second opposite ends 20 and 22 respectively. The sprinkler head riser assembly 14 comprises a cylinder portion 30, a piston portion 80, and a guard ring 120.

Figure 3:
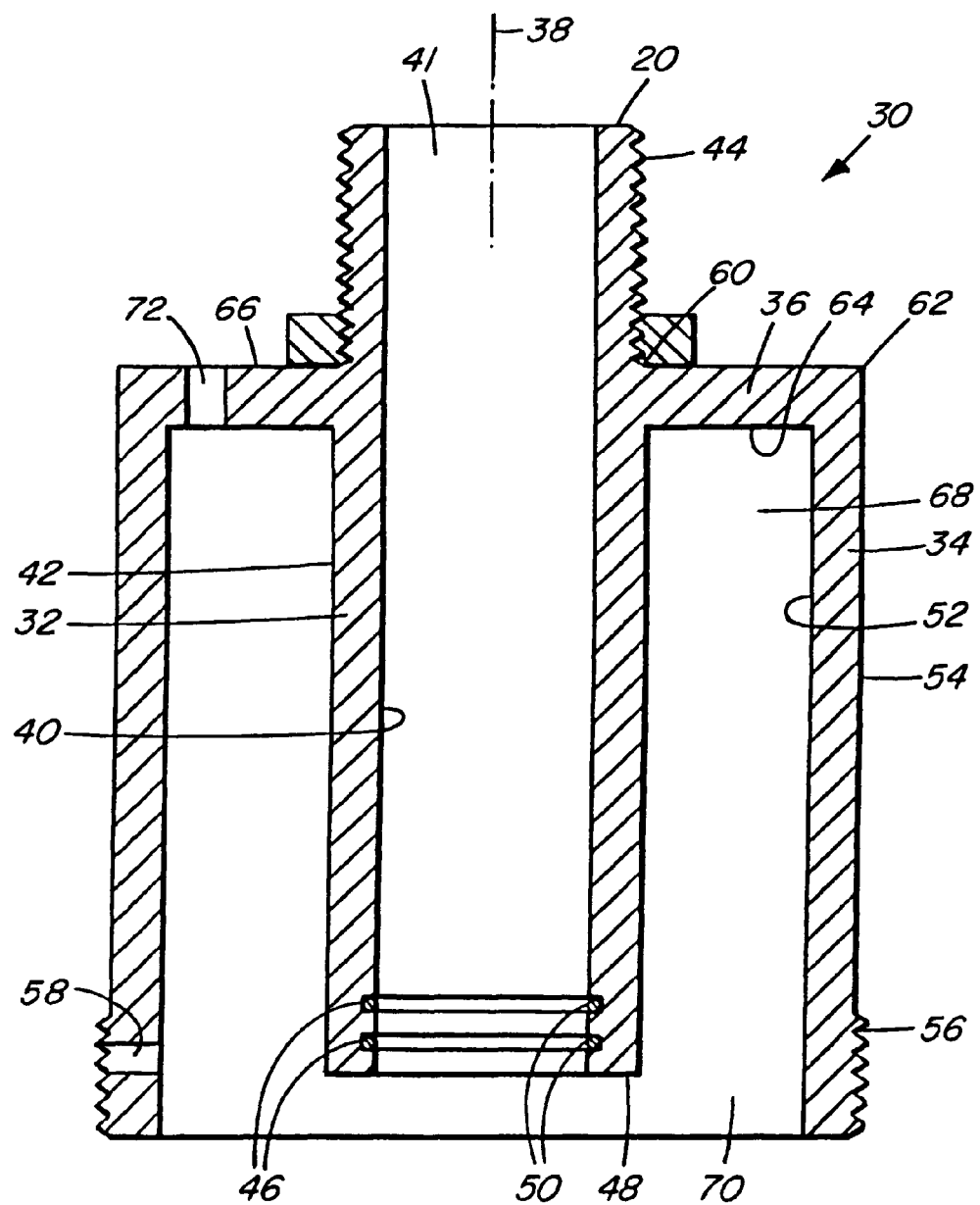
FIG. 3 is a cross sectional view of the cylinder portion of the sprinkler head riser apparatus of FIG. 2.

Referring to FIG. 3, a detail cross-sectional view of the cylinder portion of the first embodiment is shown generally at 30. The cylinder portion 30 is comprised of an elongated cylindrical first pipe portion 32 surrounded by an outer tubular shell 34. An end wall 36 connects shell 34 to pipe portion 32. The first pipe portion 32 comprises an elongated cylindrical body having an axis 38 and includes the first end 20 of the sprinkler head riser assembly 14. The first pipe portion 32 also includes an outer surface 42, an inner surface 40 forming a bore 41 therethrough, and external threading 44 at the first end 20. It will be appreciated that although external threading 44 is shown in the attached figures, other methods also be used to connect the sprinkler head riser assembly 14 to the sprinkler head assembly 12. Such alternative connection means may include but are not limited to, connecting the sprinkler head riser assembly to the sprinkler head assembly by means of glue, solder, or a compression fitting. In addition internal threading on the cylinder portion may connect to external threading on the sprinkler head assembly. The first pipe portion 32 may also include one or more internal grooves 46 in the inner surface 40 at a second end 48 each adapted to receive an O-ring 50.

The shell 34 comprises an elongated cylindrical body co-axially aligned with the first pipe portion 32 about axis 38. The shell 34 includes an inner surface 52 and an outer surface 54. The outer surface 54 may include external threading 56 and a set screw hole 58.

The end wall 36 comprises an annular disc having a substantially planar shape between first and second radii defining inner and outer edges 60 and 62, respectively. End wall 36 may be perpendicular to the axis 38 and includes an inner surface 64 and an outer surface 66. The end wall is connected at its inner edge to the first pipe portion 32 and at its outer edge to the shell 34. The outer surface 42 of the pipe portion 32, the inner surface 52 of the shell 34 and the inner surface 64 of the end wall 36 define an annular cavity 68 having an open lower end 70. The end wall 36 may also include a bore 72 therethrough so as to permit the introduction of a control fluid into the cavity 68. The bore 72 may be threaded to accept a correspondingly threaded first fluid control supply tube (140 in FIG. 1).

Figure 4:
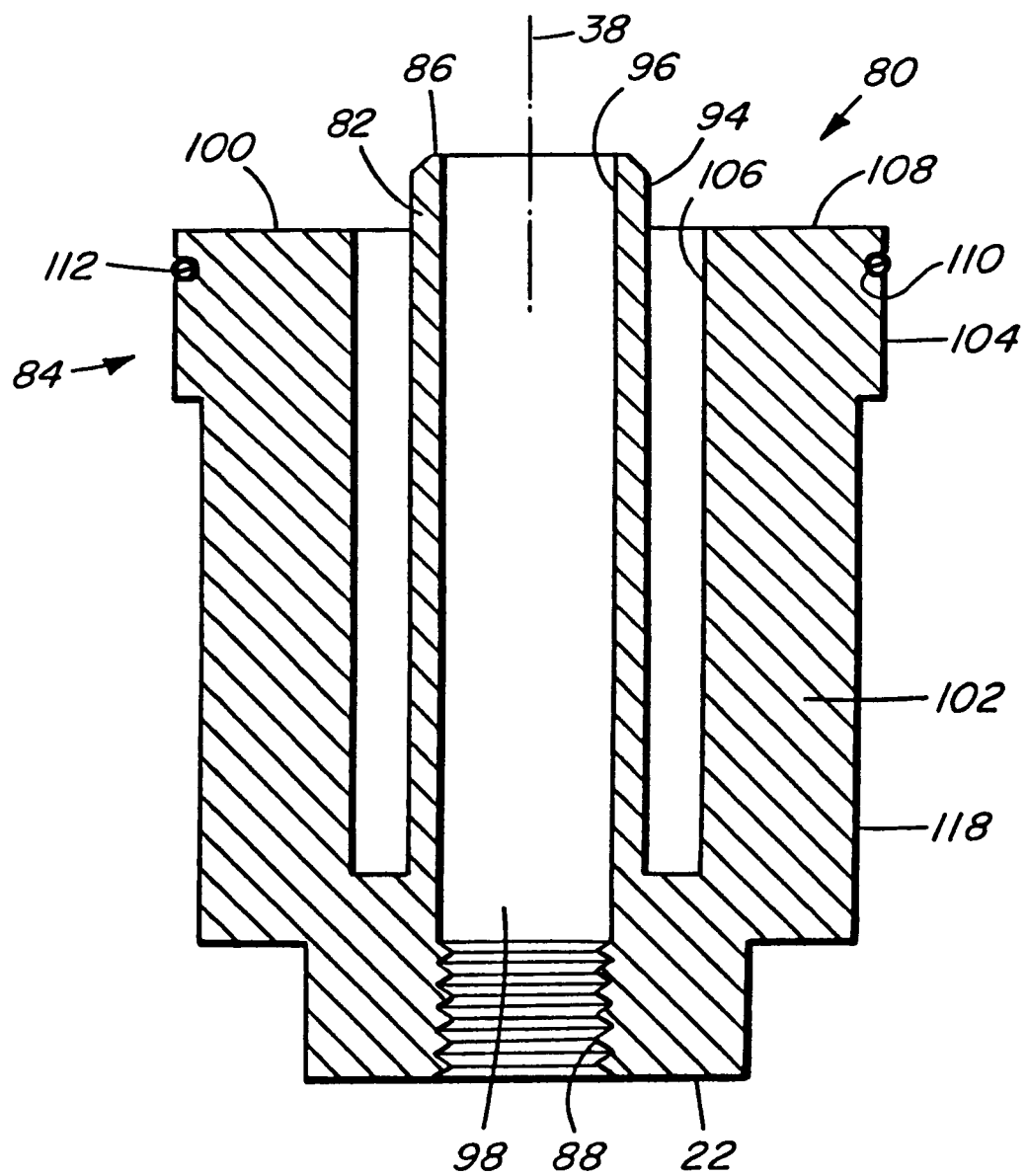
FIG. 4 is a cross sectional view of the piston portion of the sprinkler head riser apparatus of FIG. 2.

Referring to FIG. 4, a cross-sectional view of the piston portion 80 of the first embodiment is shown. The piston body comprises a second pipe portion 82 surrounded by an annular piston 84. The second pipe portion 82 comprises an elongate tubular body having a free first end 86. The opposite end of the second pipe portion merges with the piston 84 to define the second end 22 of the sprinkler head riser assembly 14. The second pipe portion 82 includes an outer surface 94 and an inner surface 96 defining a bore 98 therethrough. Bore 98 adjacent second end 22 may include internal threading 88. It will be appreciated that although internal threading 88 is shown in the attached figures, other methods may also be used to connect the sprinkler head riser assembly to the swing joint 16 or water supply pipe 18. Such alternative connection means may include but are not limited to, connecting the sprinkler head riser assembly to the sprinkler head assembly by means of glue, solder, or a compression fitting. In addition external threading on the piston portion may connect to internal threading on the sprinkler head assembly.

The piston 84 comprises a piston head 100 and a connecting portion 102. The piston head 100 comprises an annular body aligned with axis 38. The piston head 100 has an annular outer surface 104, an annular inner surface 106, and a disk-shaped end surface 108. The outer surface 104 may include a circular groove 110 adapted to receive an outer O-ring 112. The piston head 100 is connected to the second end 22 by piston connecting portion 102. Piston connecting portion 102 consists of an elongated tubular body extending between the piston head 100 and the second end 22. Piston connecting portion 102 also includes an outer cylindrical surface 118 having a central axis co-axial with axis 38.

Figure 5:
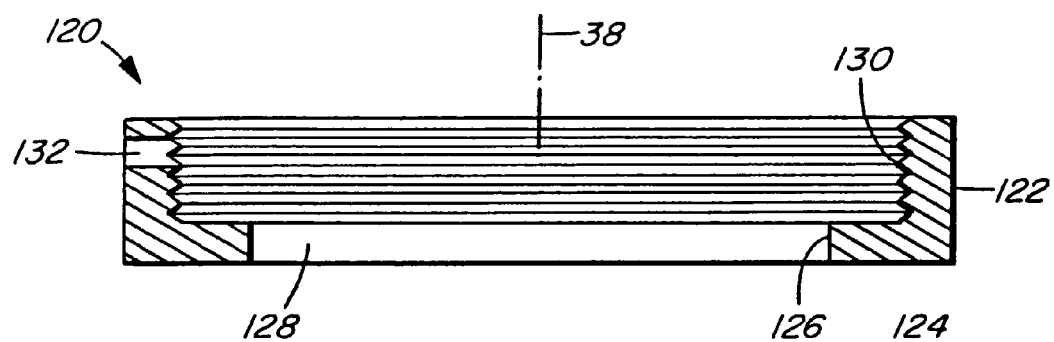
FIG. 5 is a cross sectional view of the guard ring of the sprinkler head riser apparatus of FIG. 2.

Referring to FIG. 5, a cross-sectional view of the guard ring 120 of the first embodiment is shown. The guard ring 120 comprises an annular ring 122 having an axis common with axis 38, and an internal lower flange 124. The internal flange has an inner edge 126 which defines an opening 128. The opening 128 has a radius matched to the radius of the outer cylindrical surface 118 of the piston connecting portion 102. The guard ring 120 also includes internal threading 130 operable to engage the threading 56 on the cylinder body, and a set screw hole 132.

As shown in FIG. 2, piston portion 80 is received within cylinder portion 30 such that the piston 84 is received in slidable and sealable engagement within the cavity 68, and the second pipe portion 82 is received within the first pipe portion 32. All parts are co-axially aligned with common axis 38. The piston 84 is received within the cavity 68 such that outer surface 104 slidably engages with inner surface 52 of the shell 34 and the inner surface 106 slidably engages with outer surface 42 of the first pipe portion 32. O-ring 112 preferably serves to seal the connection between the piston and the cylinder. As assembled in this manner, a first sealed control chamber 74 is formed between the cylinder and the piston head 100. Specifically, inner surface 52 of shell 34, outer surface 42 of the first pipe portion 32, inner surface 64 of end wall 36, and end surface 108 of the piston head 100 form the first sealed control chamber 74. The first sealed control chamber 74 has a volume, which changes as the piston 84 is displaced within the cylinder along axis 38. Guard ring 120 may then be secured to the external threading 56 on the shell 34 so as to enclose the bottom end of the cylinder. When the guard ring 120 is secured to the shell, the opening 128 of the guard ring may closely engage upon the outer cylindrical surface 118 of the piston connecting portion 102 so as to prevent the fouling of the riser apparatus by its surrounding soil, water and other contaminants. The guard ring 120 may also be secured to the shell by means of a set screw being passed through set screw hole 132 of the guard ring and set screw hole 58 of the shell. In addition, it will be appreciated that set screw hole 58 or an additional hole in the shell may be used as a relief port to the cylinder when the sprinkler head riser assembly is extended. The set screw hole may be contained within the guard ring 120 or may optionally include an expellable plug that may be displaced under a predetermined pressure in the cylinder so as to relieve the pressure in the cylinder.

It will be appreciated that the cylinder and piston arrangement as described above is not necessarily limited to an annular arrangement. Other cylinder and piston arrangements may be used in addition to those specifically discussed above to achieve the same result. Specifically, the cylinder and piston may have a circular shape and be disposed adjacent to the first and second pipe portions 32 and 82 respectively. In such an arrangement, the adjacent cylinder may be connected to the first pipe portion 32 and the enclosed piston connected to the second pipe portion 82. In addition, the apparatus may comprise a plurality of cylinders and associated pistons disposed around the first and second pipe portions. Such a plurality of cylinders and pistons may be arranged in an irregular or regular-radial peripheral array pattern around the first and second pipe portions 32 and 82 respectively. It will also be appreciated that in other embodiments, the first and second pipe portions 32 and 82 respectively need not be in axial alignment.

The sprinkler head riser assembly 14 according to the first embodiment may be installed as part of an underground sprinkler system as shown in FIG. 1. The underground sprinkler system may comprise a water supply pipe 18, a swing joint 16, and a sprinkler head assembly 12. Water is supplied to the system by the water supply pipe 18. This water is passed through the swing joint 16 and into the bore 98 at the second end 22 of the sprinkler head riser assembly 14. The water then passes through the bore 41 to the first end 20 and thereafter into the sprinkler head assembly 12.

Referring to FIGS. 1 and 2, a first control fluid supply tube 140 may be connected to the bore 72 in the sprinkler head riser apparatus. The first control fluid supply tube 140 comprises an elongated tube connectable to bore 72 to communicate the first sealed control chamber 74 with a control fluid source. The first control fluid supply tube includes a free end 144 disposed adjacent to the top surface 146 of the sprinkler head. The first control fluid supply tube may be free floating or secured to the sprinkler head assembly for the majority of its length. The first control fluid supply tube may also be incorporated into the sprinkler head assembly.

In operation, a user may connect a fluid source and pump (not shown) to the free end 144 of the first control fluid supply tube 140 as shown in FIG. 1. The pump is operable to supply a control fluid under pressure to the first control fluid supply tube 140. The first control fluid supply tube 140 then supplies the fluid through its second end 142 which is connected to the bore 72 in the sprinkler head riser assembly.

In such a manner, the user may increase or decrease the amount of control fluid in the first sealed control chamber 74. Varying the amount of control fluid within the first sealed control chamber 74 will serve to displace the piston 84 relative to the cylinder 30. As the piston 84 is displaced relative to the cylinder 30, the distance between the first and second ends 20 and 22, respectively, of the sprinkler head riser assembly 14 is varied.

The control fluid may include but is not limited to hydraulic fluid, water or any other suitable fluid. It will be preferable to use a control fluid that is an environmentally safe, viscous fluid. Examples of such fluids may include vegetable and grain based oils and greases as well as environmentally safe anti-freeze solutions. In addition, water may be used as a control fluid in locations where there is no risk of freezing.

Accordingly, the height of the top surface 146 of the sprinkler head assembly may be adjusted relative to the water supply pipe 18 from which it is supplied. In this way, the user may adjust the height of the sprinkler head relative to the surrounding ground to account for changes in settling soil as well as the addition of additional soil over time to maintain the top surface 146 of the sprinkler head at a desired height.

It will further be appreciated that although as described above, the sprinkler head riser assembly 14 and the sprinkler head assembly 12 are described as separate components, the sprinkler head riser apparatus may be formed including the sprinkler head assembly. According to such an embodiment, the sprinkler head will be formed as continuous with the first pipe portion. In such an alternative embodiment, the fluid may be supplied to the first sealed control chamber 74 through a supply tube internal to the sprinkler head. In some such alternative embodiments the end wall 36 may be disposed close to the to surface of the sprinkler head and therefore the fluid source and pump may be connected directly to the bore 72.

Second Embodiment

Figure 6:
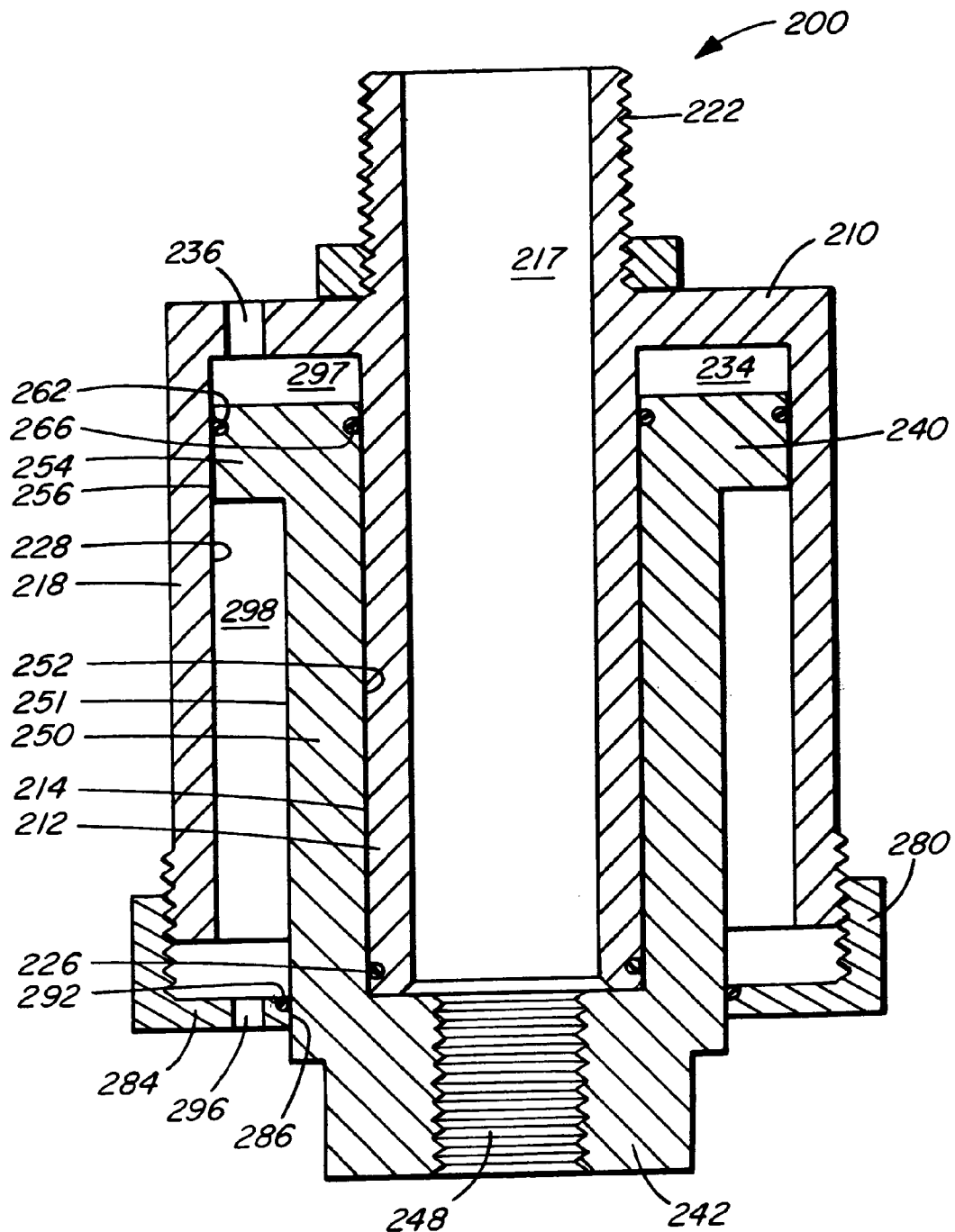
FIG. 6 is a cross-sectional view of a sprinkler head riser apparatus according to a second embodiment of the invention.

Referring to FIG. 6, a cross-sectional view of an assembled adjustable sprinkler head riser apparatus in accordance with a second embodiment of the invention is shown generally at 200. The sprinkler head riser apparatus 200 includes a cylinder portion 210, a piston portion 240, and a guard ring 280.

Figure 7:
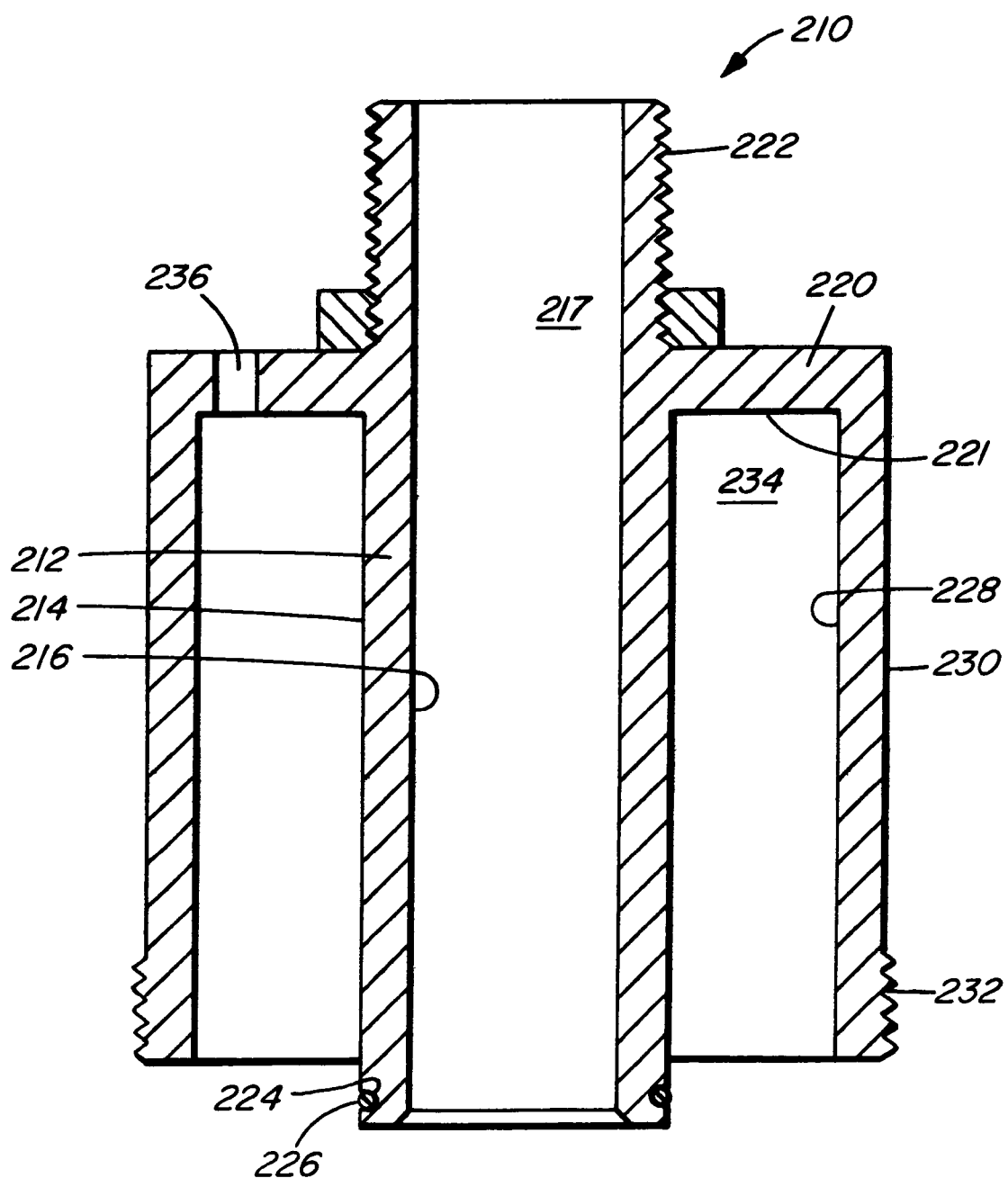
FIG. 7 is a cross sectional view of the cylinder portion of the sprinkler head riser apparatus of FIG. 6.

Referring to FIG. 7, a detail cross-sectional view of the cylinder portion of the second embodiment is shown generally at 210. The cylinder portion 210 includes an elongated cylindrical first pipe portion 212 surrounded by an outer tubular shell 218. An end wall 220 connects the outer tubular shell 218 to the first pipe portion 212. The first pipe portion 212 includes an outer surface 214 and an inner surface 216, defining a bore 217 therethrough. The first pipe portion 212 also includes external threading 222 operably configured for coupling the cylinder portion 210 to the sprinkler head assembly 12 (FIG. 1). However, it will be appreciated that other methods, such as glue, solder, a compression fitting, or internal threading, may be used for coupling the cylinder portion 210 to the sprinkler head assembly 12.

The first pipe portion 212 includes one or more grooves 224 in the outer surface 214, each operably configured to receive an O-ring 226. It has been found that in some manufacturing processes, it is easier to create the grooves 224 in the outer surface 214 of the first pipe portion 212 than it is to create internal grooves 46 in the inner surface 40 of the first pipe portion 32 of the first embodiment. It has also been found that in some manufacturing processes, it is easier to create the grooves 224 in the outer surface 214 of the first pipe portion 212 if the grooves 224 are made on a portion of the first pipe portion 212 that extends farther from the end wall 220 than the outer tubular shell 218, as shown in FIG. 7.

The outer tubular shell 218 includes an elongated cylindrical body having an inner surface 228, an outer surface 230, and external threading 232. In the second embodiment, the outer tubular shell 218 does not include a set screw hole 58. The end wall 220 includes an inner surface 221 and a bore 236, and is substantially similar to the end wall 36 of the first embodiment. The outer surface 214 of the first pipe portion 212, the inner surface 228 of the outer tubular shell 218, and the inner surface 221 of the end wall 220 define a cavity 234.

Figure 8:
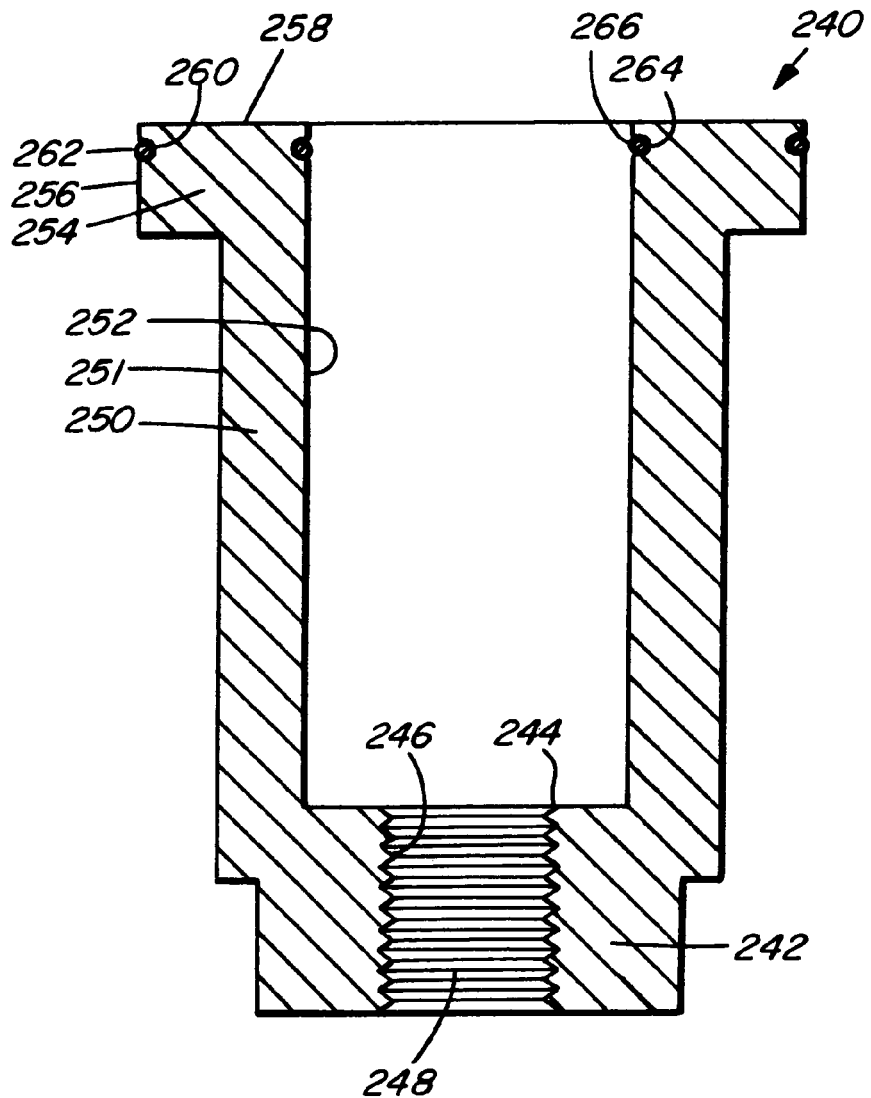
FIG. 8 is a cross sectional view of the piston portion of the sprinkler head riser apparatus of FIG. 6.

Referring to FIG. 8, a cross-sectional view of the piston portion of the second embodiment is shown generally at 240. The piston portion 240 includes a second pipe portion 242 coupled to an annular piston 250. The second pipe portion 240 includes an inner surface 244 defining a bore 248 therethrough. The inner surface 244 includes internal threading 246 operably configured for coupling the piston portion 240 to the swing joint 16 or to the water supply pipe 18 (FIG. 1). It will be appreciated that other methods, such as glue, solder, a compression fitting, or external threading, may be used for coupling the piston portion 240 to the swing joint 16 or to the water supply pipe 18.

In the second embodiment, the second pipe portion 242 does not extend substantially along the length of the annular piston 250. It has been found that in some manufacturing processes, manufacturing the piston portion 240 is easier than manufacturing a piston portion wherein the second pipe portion extends substantially along the length of the annular piston.

In the second embodiment, the annular piston 250 includes an annular outer surface 251, an annular inner surface 252, and a piston head 254. The piston head 254 includes an annular outer surface 256 and a disk-shaped end surface 258. The outer surface 256 includes a circular groove 260 operably configured for receiving an outer O-ring 262, and the inner surface 252 includes a circular groove 264 operably configured for receiving an inner O-ring 266. However, in other embodiments, the circular grooves 260 and 264 and the O-rings 262 and 266 may be omitted. In particular, the circular groove 264 and the O-ring 266 may be omitted because sealing between the outer surface 214 and the annular inner surface 252 is provided by the O-ring 226 described above.

Figure 9:
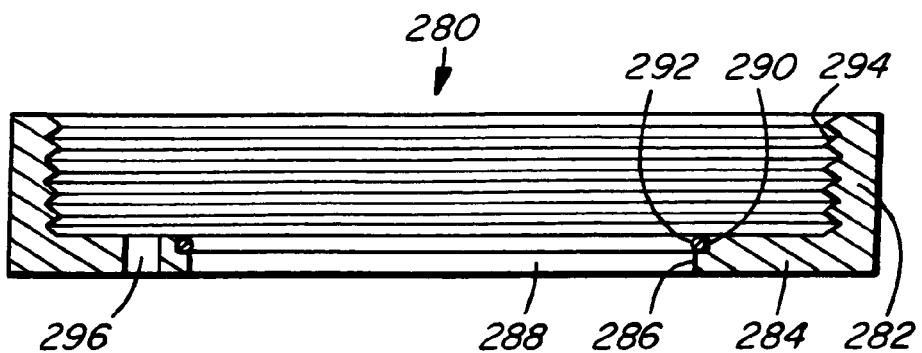
FIG. 9 is a cross sectional view of the guard ring of the sprinkler head riser apparatus of FIG. 6.

Referring to FIG. 9, a cross-sectional view of the guard ring of the second embodiment is shown generally at 280. The guard ring 280 includes an annular ring 282, and an internal lower flange 284. The internal lower flange 284 has an inner edge 286 that defines an opening 288 having a suitable radius for the annular piston 250 (FIG. 8) to pass therethrough such that the annular outer surface 251 may be in slidable and sealable engagement with the inner edge 286. The inner edge 286 includes a circular groove 290 operably configured for receiving an O-ring 292. The guard ring 280 also includes internal threading 294 operably configured for engaging the external threading 232 of the cylinder portion 210 (FIG. 7), but it will be appreciated that other methods, such as glue or solder, may be used for coupling the cylinder portion 210 to the guard ring 280. In the second embodiment, the guard ring 280 does not include a set screw hole 132. However, in the second embodiment, the guard ring 280 includes a bore 296 therethrough.

Referring back to FIG. 6, the annular piston 250 of the piston portion 240 is received within the cavity 234 of the cylinder portion 210 such that the outer O-ring 262 and the annular outer surface 256 of the piston head 254 are in slidable and sealable engagement with the inner surface 228 of the outer tubular shell 218, and the inner O-ring 266 and the annular inner surface 252 of the annular piston 250 are in slidable and sealable engagement with the O-ring 226 and the outer surface 214 of the first pipe portion 212. Thus, a first sealed control fluid chamber 297 is formed between the piston head 254 and the end wall 220, and the bores 217 and 248 form a continuous sealed water passage through the sprinkler head riser apparatus 200. The guard ring 280 may be coupled to the cylinder portion 210 such that the annular outer surface 251 of the annular piston 250 is in slidable and sealable engagement with the O-ring 292 and the inner edge 286 of the internal lower flange 284 of the guard ring 280. Although the first and second pipe portions 212 and 242 respectively are shown in axial alignment, it will be appreciated that the first and second pipe portions need not be in axial alignment.

The result of this assembly, and the operation of the sprinkler head riser apparatus 200, are substantially as described above with reference to the first embodiment. However, in the second embodiment, the annular piston 250, the outer tubular shell 218, and the guard ring 280 define a second sealed control fluid chamber 298. A second fluid control supply tube (not shown) may be coupled to the bore 296, so that a user may supply a control fluid under pressure to the second sealed control fluid chamber 298. Thus, in the second embodiment, a user may supply a control fluid under pressure independently through the bores 236 and 296 to "double acting" control fluid chambers 297 and 298 respectively, thereby exerting complementary forces on the piston portion 240 relative to the cylinder portion 210.

Third Embodiment

Figure 10:
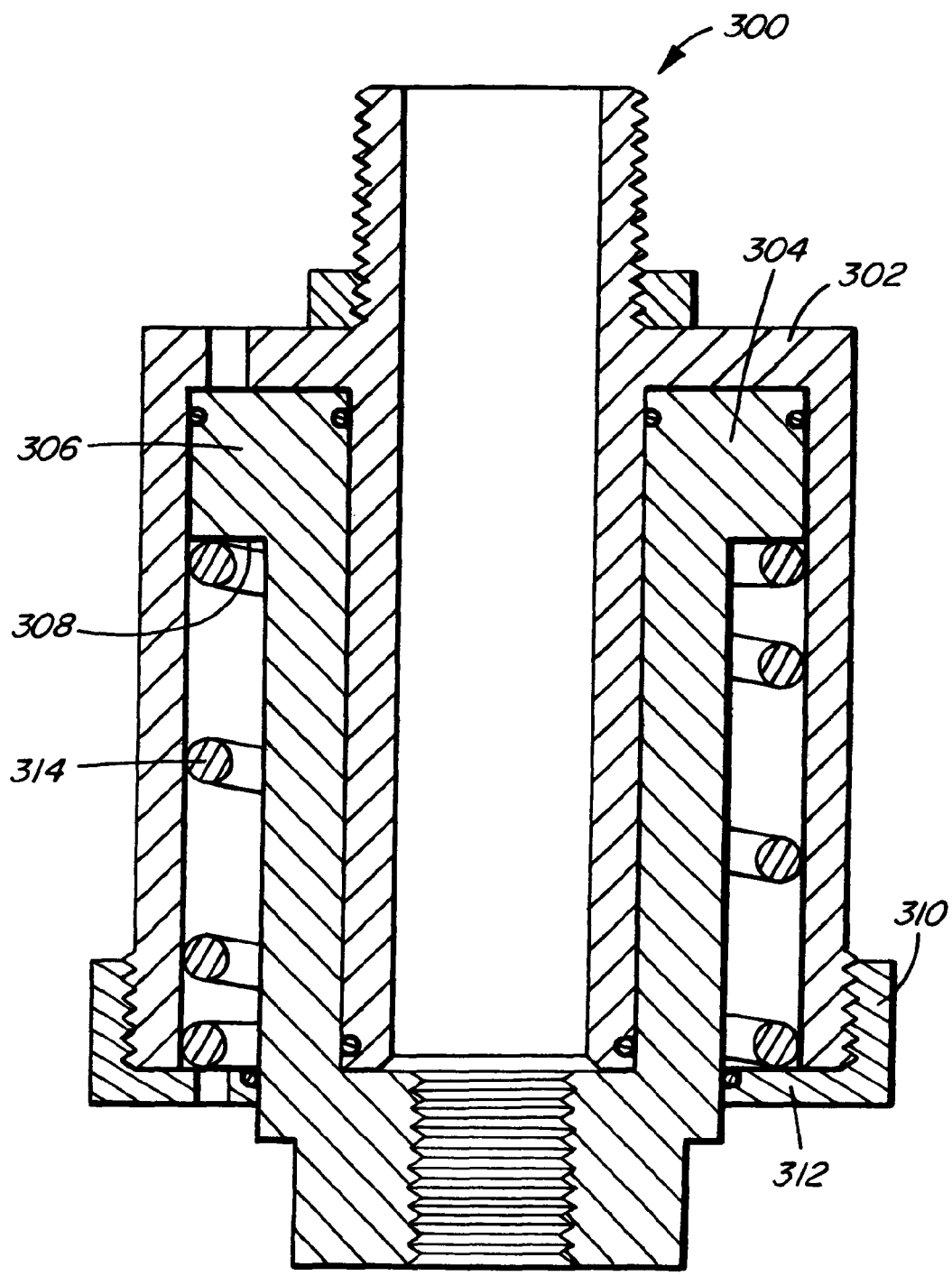
FIG. 10 is a cross-sectional view of a sprinkler head riser apparatus according to a third embodiment of the invention.

Referring to FIG. 10, a sprinkler head riser apparatus in accordance with a third embodiment of the invention is shown generally at 300. The sprinkler head riser apparatus 300 includes a cylinder portion 302, a piston portion 304, and a guard ring 310. The piston portion 304 includes a piston head 306, and the piston head 306 includes a disk-shaped lower surface 308. The guard ring 310 includes an internal lower flange 312. The sprinkler head riser apparatus 300 includes the elements of the first embodiment or the second embodiment, and further includes a spring 310 for urging the annular lower surface 308 away from the internal lower flange 312. The spring 310 may advantageously resist a potential tendency for water pressure in the sealed water passage to urge the annular lower surface 308 towards the internal lower flange 312. However, in other embodiments, the spring 310 may urge the annular lower surface 308 towards the internal lower flange 312.

While specific embodiments of the invention have been described and illustrated, such embodiments should be considered illustrative of the invention only and not as limiting the invention as construed in accordance with the accompanying claims.

What is claimed is:

1. A sprinkler head riser apparatus for an in-ground sprinkler system, the apparatus comprising:
    an extendible pipe assembly comprising first and second pipe portions each having an interior through which sprinkler fluid can flow;
    a sprinkler head assembly attached to the extendible pipe assembly for receiving the sprinkler fluid and discharging the sprinkler fluid from the sprinkler system, the sprinkler head assembly comprising a top surface;
    a cylinder having an end wall and an open end, said cylinder being connected to the first pipe portion ; and
    a piston received in slidable and sealable engagement with said cylinder, said piston being connected to the second pipe portion, wherein said piston, cylinder and end wall define a first chamber;
    said first chamber being adapted to receive a first control fluid from a source exterior to the sprinkler head riser apparatus, said first control fluid when received in said first chamber displacing said piston relative to said cylinder to vary a distance between an end of the first pipe portion and an end of the second pipe portion and raise the top surface of the sprinkler head assembly relative to surrounding ground while permitting fluid communication between the first and second pipe portions;
    wherein said first chamber, and the first control fluid therein, is fluidly isolated from the first and second pipe portions, as well as from the sprinkler fluid flowing through the first and second pipe portions for discharge from the sprinkler system.

2. The apparatus of claim 1 wherein said first chamber has an annular shape disposed around the first pipe portion.

3. The apparatus of claim 2 wherein the first pipe portion defines an interior wall of said first chamber, and wherein said piston is in slidable and sealable engagement with the first pipe portion.

4. The apparatus of claim 1 wherein said cylinder includes a first inlet port, and wherein said first inlet port comprises a first bore through said end wall.

5. The apparatus of claim 4 wherein said first bore is threaded.

6. The apparatus of claim 5 further comprising a first supply tube threadably received in said first bore.

7. The apparatus of claim 1 wherein said sprinkler head riser apparatus is buried.

8. The apparatus of claim 1 further including a guard ring adapted to slidably enclose said open end of said cylinder around said piston.

9. The apparatus of claim 8 wherein said guard ring, said piston, and said cylinder define a second chamber adapted to receive a second control fluid for displacing said piston relative to said cylinder to vary said distance between the end of said first pipe portion and the end of said second pipe portion.

10. The apparatus of claim 9 wherein said guard ring further includes a second inlet port operable to receive a second supply line to supply said second control fluid to said second chamber.

11. The apparatus of claim 10 wherein said second inlet port comprises a second threaded bore.

12. The apparatus of claim 11 further including a second supply tube threadably received in said second inlet port, said second supply tube having a free end adapted to be connected to a second pump so as to supply said second control fluid to said second chamber.

13. The apparatus of claim 8 further comprising a spring operably configured for urging said guard ring in a direction relative to said piston portion.

14. The apparatus of claim 1 wherein the first pipe portion is in slidable and sealable engagement with the second pipe portion.

15. The apparatus of claim 1 wherein the first pipe portion extends farther from said end wall than said cylinder.

16. The apparatus of claim 1 wherein said first pipe portion is slidably and sealably received within said second pipe portion.

17. The apparatus of claim 1 wherein said second pipe portion is slidably and sealably received within first pipe portion.

18. The apparatus of claim 1 wherein said first and second pipe portions include first and second opposite threaded ends respectively.

19. The apparatus of claim 6 wherein said first pipe portion further includes said sprinkler head assembly disposed at a free end of said first pipe portion.

20. The apparatus of claim 19 wherein said first supply tube is in communication with said bore.

21. The apparatus of claim 20 wherein said first supply tube is integral with said sprinkler head assembly.

22. The apparatus of claim 1 further comprising a plurality of said cylinders and corresponding pistons adjacent to said first and second pipe portions.

23. The apparatus of claim 22 wherein said plurality of cylinders and corresponding pistons are disposed in a peripheral array around said first and second pipe portions.

24. A method of changing the length of an extendible pipe assembly operable to convey sprinkler fluid to a sprinkler head assembly in an in-ground sprinkler system, the method comprising:
   providing a pipe assembly comprising first and second pipe portions wherein said first and second pipe portions are axially aligned and define the extendible pipe assembly having a common sealed passage therethrough, through which sprinkler fluid can flow and wherein the sprinkler head assembly is attached to the extendible pipe, the sprinkler head assembly receiving the sprinkler fluid from the first and second pipe portions and discharging the sprinkler fluid from the sprinkler system, the sprinkler head assembly comprising a top surface;
   introducing a control fluid from a source independent of the pipe assembly and the sprinkler head assembly into a chamber connected to said first pipe portion so as to displace a piston slidably and sealably contained within said chamber wherein said piston is connected to said second pipe portion;
   whereby the displacement of said piston resulting from the introduction of control fluid into the chamber varies a distance between an end of the first pipe portion and an end of the second pipe portion to raise the top surface of the sprinkler head assembly relative to surrounding ground, and the chamber, and the control fluid therein, is fluidly isolated from the common sealed passage through the first and second pipe portions, and also fluidly isolated from the sprinkler head assembly to prevent the control fluid from mixing with the sprinkler fluid.

25. The apparatus of claim 1 wherein said first chamber is adapted to receive said first control fluid to displace said piston relative to said cylinder to increase said distance between said end of said first pipe portion and said end of said second pipe portion.

26. The apparatus of claim 1 further comprising a swing joint in fluid communication with the extendible pipe for adjusting a position of the apparatus.

27. The apparatus of claim 1 wherein said cylinder includes a first inlet port, the apparatus further comprising a first supply tube having a free end and a second end, the free end being adapted to be connected to the source and being disposed adjacent to the top surface of the sprinkler head assembly, the first supply tube being attached to said sprinkler head assembly, and the second end being connectable to the first inlet port to permit the first control fluid to be supplied from the source to said first chamber.

\* \* \* \* \*